United States Patent
St. Laurent et al.

(10) Patent No.: US 9,853,864 B2
(45) Date of Patent: Dec. 26, 2017

(54) SYSTEM AND METHOD FOR UPDATING PRINTER LOCATION INFORMATION FIELD

(75) Inventors: Michael St. Laurent, Baden (CA); Mark Onischke, Kitchener (CA); Michael Kuindersma, Conestoga (CA); Dharmesh Krishnammagaru, Kitchener (CA); Jonathon Stairs, Kitchener (CA); Ken Noreikis, Orland Park, IL (US)

(73) Assignee: PRINTERON INC., Ontario (CA)

( * ) Notice: Subject to any disclaimer, the term of this patent is extended or adjusted under 35 U.S.C. 154(b) by 55 days.

(21) Appl. No.: 12/884,722

(22) Filed: Sep. 17, 2010

(65) Prior Publication Data

US 2012/0072595 A1 Mar. 22, 2012

(51) Int. Cl.
*G06F 15/173* (2006.01)
*H04L 12/24* (2006.01)
*G06F 21/60* (2013.01)
*G06F 21/62* (2013.01)
*H04L 29/06* (2006.01)

(52) U.S. Cl.
CPC ............ *H04L 41/12* (2013.01); *G06F 21/608* (2013.01); *G06F 21/6209* (2013.01); *G06F 2221/2111* (2013.01); *H04L 63/029* (2013.01); *H04L 63/101* (2013.01); *H04L 63/107* (2013.01)

(58) Field of Classification Search
CPC .......... G06F 21/608; G06F 2221/2111; G06F 3/1226; G06F 3/1288; H04L 41/12; H04L 63/101; H04L 63/107
USPC ......................... 709/226–229; 358/1.14–1.15
See application file for complete search history.

(56) References Cited

U.S. PATENT DOCUMENTS

| | | |
|---|---|---|
| 5,872,926 A | 2/1999 | Levac et al. |
| 5,958,006 A | 9/1999 | Eggleston et al. |
| 6,049,711 A | 4/2000 | Ben-Yehezkel et al. |
| 6,085,227 A | 7/2000 | Edlund et al. |
| 6,092,114 A | 7/2000 | Shaffer et al. |
| 6,138,162 A | 10/2000 | Pistriotto et al. |
| 6,445,824 B2 | 8/2002 | Hieda |
| 6,553,422 B1 | 4/2003 | Nelson |
| 6,598,076 B1 | 7/2003 | Chang et al. |
| 6,925,595 B1 | 8/2005 | Whitledge et al. |
| 6,978,299 B1 | 12/2005 | Lodwick |
| 2001/0044829 A1 | 11/2001 | Lundberg |

(Continued)

FOREIGN PATENT DOCUMENTS

EP 1435565 7/2004

*Primary Examiner* — Hitesh Patel
(74) *Attorney, Agent, or Firm* — Occhiuti & Rohlicek LLP

(57) ABSTRACT

A system and method are provided for updating location information associated with a printer resource stored in a printer resource registry in a network resource access system. Updating the location information for the printer resource may involve obtaining a unique identifier for the printer resource, determining the location of the printer using GPS or other location based services, authenticating access to the printer resource registry, and submitting the location information to the printer resource registry. Systems for updating location information in the resource registry may operate on the printer resource by itself or in conjunction with a mobile device. System may operate autonomously or provide a user interface for a system administrator to update location information.

12 Claims, 10 Drawing Sheets

(56) References Cited

U.S. PATENT DOCUMENTS

| | | | |
|---|---|---|---|
| 2002/0016818 A1 | 2/2002 | Kirani et al. | |
| 2002/0066026 A1 | 5/2002 | Yau et al. | |
| 2002/0155843 A1 | 10/2002 | Bahl et al. | |
| 2002/0194266 A1* | 12/2002 | Brebner et al. | 709/203 |
| 2003/0037126 A1* | 2/2003 | Spicer et al. | 709/220 |
| 2003/0090694 A1 | 5/2003 | Kennedy et al. | |
| 2003/0191676 A1 | 10/2003 | Templeton | |
| 2004/0125401 A1 | 7/2004 | Earl et al. | |
| 2004/0185877 A1* | 9/2004 | Asthana | G06Q 30/02 455/456.6 |
| 2004/0190049 A1 | 9/2004 | Itoh | |
| 2004/0252337 A1 | 12/2004 | Takabayashi et al. | |
| 2005/0085241 A1* | 4/2005 | Bahl et al. | 455/456.1 |
| 2006/0168258 A1 | 7/2006 | Spicer et al. | |
| 2007/0234354 A1* | 10/2007 | Hattori | 717/177 |
| 2008/0158597 A1 | 7/2008 | Hashimoto et al. | |
| 2008/0184162 A1* | 7/2008 | Lindsey et al. | 715/783 |
| 2008/0193182 A1 | 8/2008 | Sasama | |
| 2008/0246988 A1* | 10/2008 | Ashton | 358/1.15 |
| 2011/0096354 A1* | 4/2011 | Liu | 358/1.15 |
| 2014/0253939 A1* | 9/2014 | Hashimoto | G06F 3/1232 358/1.13 |
| 2014/0283136 A1* | 9/2014 | Dougherty et al. | 726/29 |

* cited by examiner

SYSTEM AND METHOD FOR UPDATING PRINTER LOCATION INFORMATION FIELD

FIELD

The present invention relates to a method and system for a network management system. In particular, the present invention relates to a method and system for providing location information of network resources to the network management system.

BACKGROUND

Local area networks are widely used as a mechanism for making available computer resources, such as file servers, scanners and printers, to a multitude of computer users. It is often desirable with such networks to restrict user access to the computer resources in order to manage data traffic over the network and to prevent unauthorized use of the resources. Typically, resource access is restricted by defining access control lists for each network resource. However, as the control lists can only be defined by the network administrator, it is often difficult to manage data traffic at the resource level.

Wide area networks, such as the Internet, have evolved as a mechanism for providing distributed computer resources without regard to physical geography. The Internet Print Protocol ("IPP") emerged as a mechanism to control access to printing resources over the Internet. However, IPP was replete with deficiencies particularly with respect to administration of a large number of network resources to a large user base. For example, the ability to restrict access to firewall protected network resources is compromised when firewall access ports remain open for extended periods of time, i.e. are open and waiting for network traffic to access them. For example, access to IPP printers cannot be obtained without the resource administrator locating the resource outside the enterprise firewall, or without opening an access port through the enterprise firewall. Whereas the latter solution provides the resource administrator with the limited ability to restrict resource access, the necessity of keeping open an access port in the enterprise firewall exposes the enterprise network to the possibility of security breaches.

Network resource access systems were developed that provide a central mechanism that simplified access to network resources such as printers. The network resource access system typically included a central database for storing information about the printer resources that assisted users in finding and using the desired network resource. Often these systems would rely on a name or description of the location that a user of the system would use to select or locate the physical location of the network resource.

User's of a network resource access system may want to use a network resource that is located nearest their location, especially if the network resource is a printer resource from which the user needs to recover a hard copy document. Modern network terminal devices that are used to access the system are more often being equipped with location collection systems such as GPS. If the central database contains accurate location information, user's can use their current location to find the nearest printer using the central database.

Past systems have relied on street address information or have converted the street address to geographical coordinates prior to storing the information in the database. If a street address has multiple printers in the building, then this type of location information may not be of assistance to user trying to find the closest printer in the building to their current location. User's of the systems would be better served if the database contained more accurate location information.

Managing the location information in the central database may also be a difficult task for systems administrators. Often the user interface used to update or populate the database is not located with the printer, thus obtaining the location of the printer and entering the data are two separate tasks performed by the system administrator. If GPS coordinates are used from a portable GPS transceiver, then the system administrator must walk to the printer with the GPS device, obtain the coordinates and return to the user interface used to update the database to enter the GPS data. This process is prone to error from transcription or selecting the wrong printer. Also, due to the time involved in updating location information in the system, systems administrators may be less likely to provide location information for the devices that they manage.

SUMMARY

A system and method for submitting printer resource location information in a network resource access system is provided that simplifies the process of providing location information to a resource registry in a network resource access system and ensures more accurate location information.

In one aspect, there is provided a method for submitting printer location information in a network resource access system of a printer resource by obtaining a unique printer resource identifier for the printer resource; determining coordinate-based location information for the printer resource; authenticating access to a printer resource registry; and submitting coordinate-based location information using the unique printer resource identifier associated with the printer resource to the printer resource registry.

In another aspect, there is provided a system for submitting printer location information in a network resource access system. The system comprises a printer resource database server that stores location information associated with printer resources; a printer resource managed by the network resource access system having a processor and memory, the processor configured to execute: a location information collection module that obtains coordinate-based location information; and an administrator interface connected to the location information collection module that submits location information for the printer resource to the printer resource database server.

In another aspect, there is provided a system for submitting printer location information in a network resource access system. The system comprises a printer resource database server that stores location information associated with printer resources; a printer resource; a mobile device located in proximity to the printer resource, the mobile device having a processor and memory, the processor configured to execute: a location information collection module that obtains coordinate-based location information; and an administrator interface connected to the location information collection module that submits location information for the printer resource to the printer resource database server.

In still another aspect, there is provided a system for submitting printer location information in a network resource access system. The system comprises a printer resource database server that stores location information associated with printer resources; a printer resource having a processor and memory, the processor configured to execute: an administrator interface that receives location information from the mobile device and submits location information for the printer resource to the printer resource database server; a mobile device located in proximity to the printer resource, the mobile device having a processor and memory, the processor configured to execute: a location information collection module that obtains coordinate-based location information.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

Figure 1:
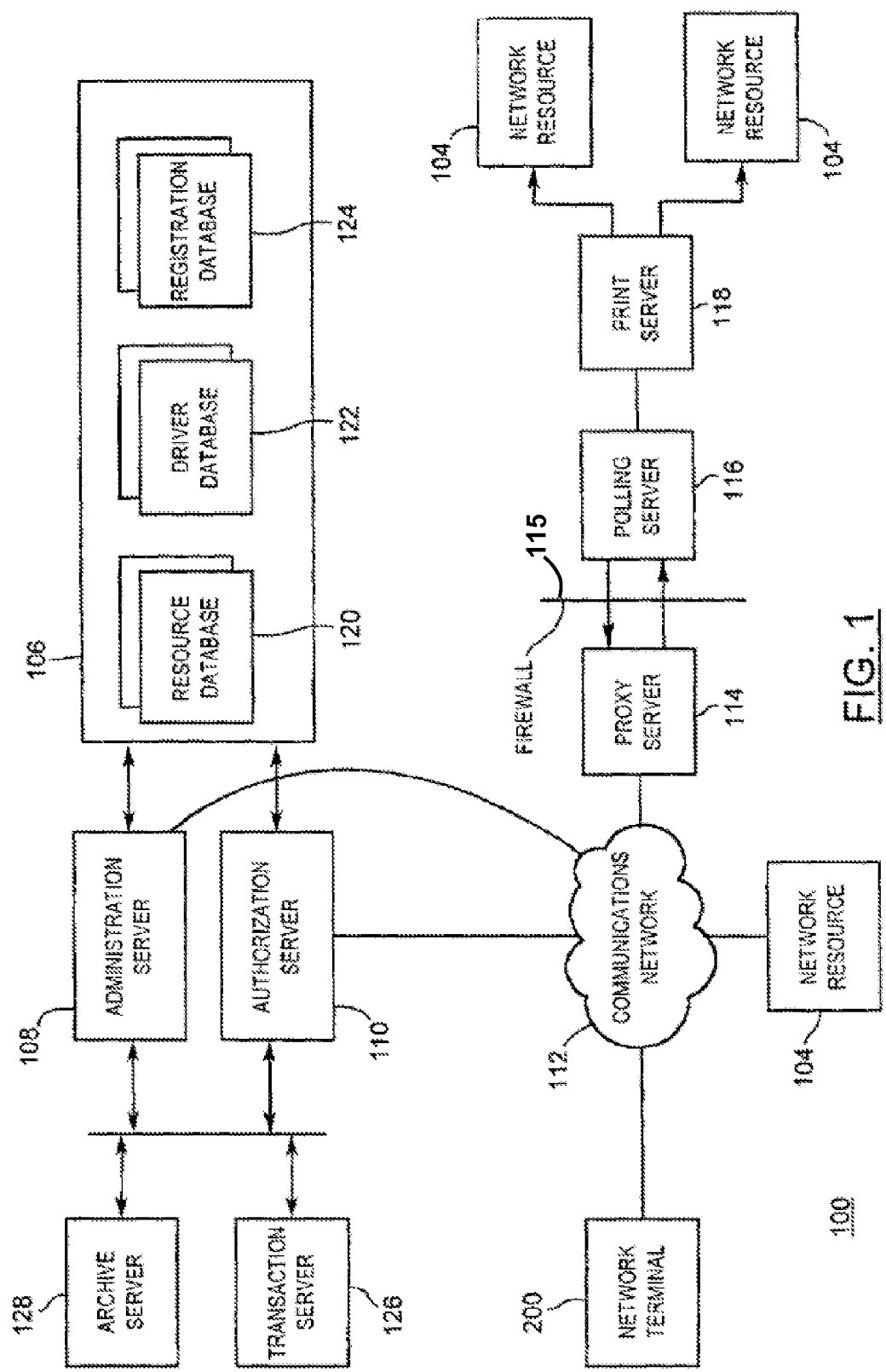
FIG. 1 is a schematic view of the network resource access system, according to the present invention, showing the network terminals, the network resources, the resource registry, the authorization server, the administration server, the proxy server, and the polling server.

Turning to FIG. 1, a network resource access system, denoted generally as 100, is shown comprising network terminals 200, network resources 104, a resource registry 106, an administration server 108, and an authorization server 110. Typically, the network resource access system 100 comprises a plurality of network terminals 200, and a plurality of network resources 104, however for enhanced clarity of discussion, FIG. 1 only shows a single network terminal 200 and a single network resource 104.

The network resource access system 100 also includes a communications network 112 facilitating communication between the network terminals 200, the network resources 104, the administration server 108, and the authorization server 110. Preferably, the communications network 112 comprises a wide area network such as the Internet, however the network 112 may also comprise one or more local area networks 112. Further, the network 112 need not be a land-based network, but instead may comprise a wireless network and/or a hybrid of a land-based network and a wireless network for enhanced communications flexibility.

Each network terminal 200 typically comprises a land-based network-enabled personal computer. However, the invention is not limited for use with personal computers. For instance, one or more of the network terminals 200 may comprise a wireless communications device, such as a wireless-enabled personal data assistant, or e-mail-enabled wireless telephone if the network 112 is configured to facilitate wireless data communication. In addition, the invention is not limited to only facilitating transmission of text data 221, but instead may be used to transmit image data, audio data or multimedia data, if desired.

Figure 2:
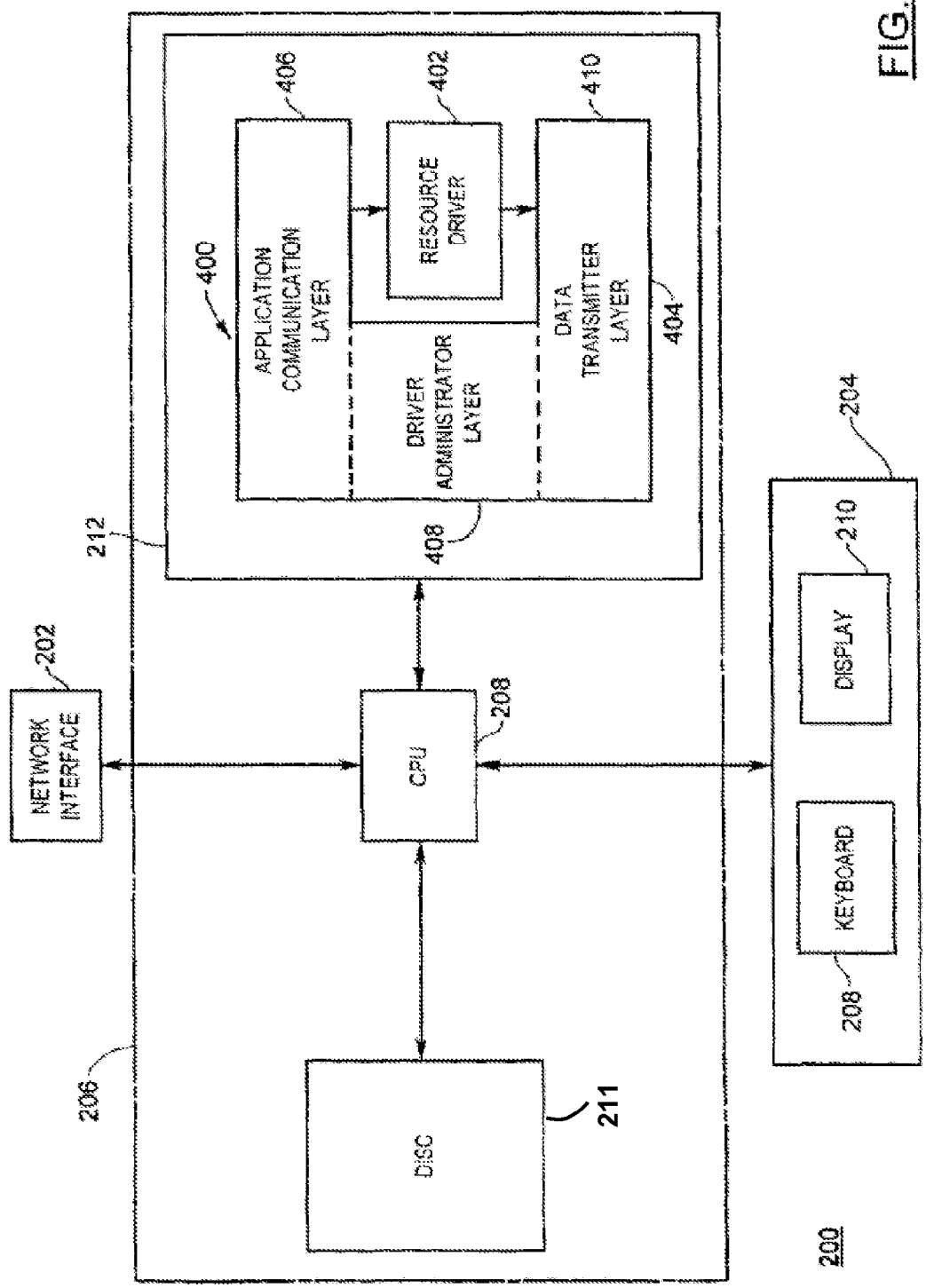
FIG. 2 is a schematic view one of the network terminals depicted in FIG. 1, showing the driver application for use with the present invention.

As shown in FIG. 2, the network terminal 200 comprises a network interface 202, a user interface 204, and a data processing system 206 in communication with the network interface 202 and the user interface 204. Typically, the network interface 202 comprises an Ethernet network circuit card, however the network interface 202 may also comprise an RF antenna for wireless communication over the communications network 112. Preferably, the user interface 204 comprises a data entry device 208 (such as keyboard, microphone, touch screen or writing tablet), and a display device 210 (such as a CRT or LCD display).

The data processing system 206 includes a central processing unit (CPU) 208, and a non-volatile memory storage device (DISC) 211 (such as a magnetic disc memory or electronic memory) and a read/write memory (RAM) 212 both in communication with the CPU 208. The DISC 211 includes data which, when loaded into the RAM 212, comprise processor instructions for the CPU 208 which define memory objects for allowing the network terminal 200 to communicate with the network resources 104 and the authorization server 110 over the communications network 112. The network terminal 200, and the processor instructions for the CPU 208 will be discussed in greater detail below.

Typically, each network resource 104 can comprise a printing device, and in particular, an IPP-compliant printer. However, the invention is not limited for use with networked printers (IPP-compliant or otherwise), but instead can be used to provide access to any of a variety of data communication devices, including facsimile machines, image servers and file servers. Further, the invention is not limited for use with land-based data communications devices, but instead can be used to provide access to wireless communications devices. For instance, the network resource access system 100 can be configured to facilitate data communication with e-mail pagers or e-mail enabled wireless telephones 200.

It is expected that some of the network resources 104 may be located behind an enterprise firewall 115. Accordingly, to facilitate communication between network terminals 200 and firewall-protected network resources 104, the network resource access system 100 may also include a proxy server 114 located logically outside the enterprise firewall 115, and a polling server 116 located logically within the firewall 115, as shown in FIG. 1. Preferably, the proxy server 114 is located on-site at the enterprise responsible for administering the network resource 104, is provided with a network address corresponding to the enterprise, and includes a queue or other memory storage device for receiving application data and control data. However, the proxy server 114 may also be located off-site, and may be integrated with the authorization server 110 if desired. This latter option can be advantageous since it allows system administrators to provide access to network resources 104, but without having to incur the expense of the domain name registration and server infrastructure.

In addition to the proxy server 114 and the polling server 116, the enterprise can include an enterprise/resource server 118 (e.g. a print server) to facilitate communication with the network resources 104 located behind the firewall 115 and the polling server 116. The polling server 116 is in communication with the enterprise server 118, and is configured to initiate periodic polling messages to the proxy server 114 through the firewall 115 to determine whether application data and/or control data from or otherwise associated with a network terminal 200 is waiting in the queue of the proxy server 114. The proxy server 114 is configured to transmit any stored/queued application data to the polling server 116 in response to the poll signal from the polling server 116, as well as any control data associated with the application data in response to a poll signal. Upon receipt of the stored application data from the proxy server 114, the polling server 116 can transmit the application data to the enterprise server 118 for distribution to the appropriate network resource 104, for example. This polling mechanism allows application data to be transmitted to network resources 104 located behind a firewall 115, but without exposing the enterprise to the significant possibility of security breaches associated with firewall 115 access ports that may be open.

Figure 3:
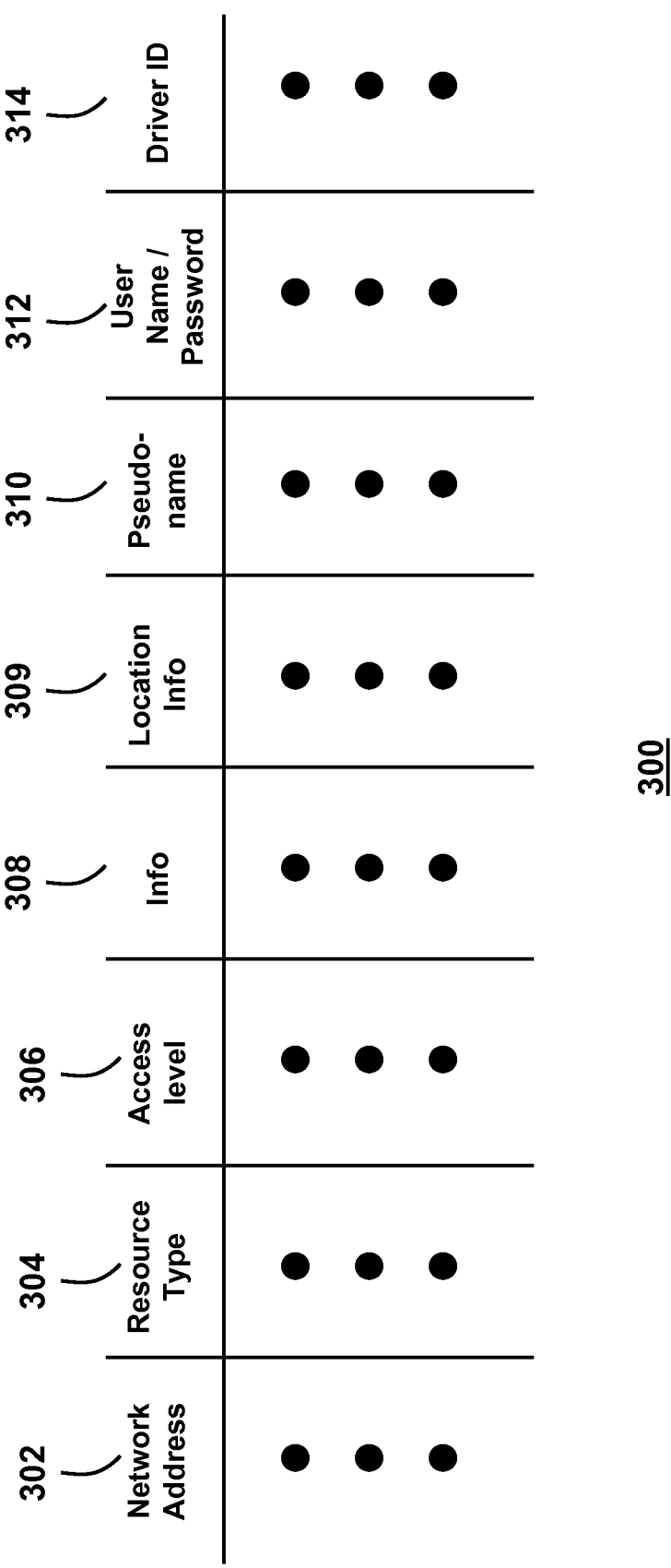
FIG. 3 is a schematic view of the format of the resource records comprising the resource database of the resource registry depicted in FIG. 1, showing the network address field, the resource type field, the user access level field, the resource information field, the pseudo-name field, the username/password field, and the driver identification field.

The resource registry 106 comprises a resource database 120, a driver database 222, and a user registration database 124. The resource database 120 includes resource records 300 identifying parameters associated with the network resources 104. As shown in FIG. 3, each resource record 300 comprises a network address field 302, a resource type field 304, and a user access level field 306 for the associated network resource 104. The network address field 302 identifies the network address of the network resource 104. As discussed above, a network resource 104 may comprise an IPP-compliant printer or other network connected printer, in which case the network address field 302 identifies the IP address to access the printer. For example, in the case where the network resource 104 comprises a non-IPP-compliant device and the communications network 112 comprises the Internet, preferably the network resource 104 is linked to the communications network 112 via a suitable server, and the network address field 302 for the network resource 104 identifies the IP address of the server.

The resource type field 304 identifies the type of data communication device of the network resource 104. For instance, the resource type field 304 may specify that the network resource 104 is a printer, an image server, a file server, an e-mail pager, or an e-mail enabled wireless telephone. Further, the resource type field 304 may include a resource type sub-field specifying a sub-class of the network resource type. For example, the resource type sub-field may specify that the network resource 104 is an IPP-capable printer, or a non-IPP-capable printer.

The user access level field 306 identifies the type of communications access which the network terminals 200 are allowed to have in regards to the associated network resource 104. In some embodiments, the user access level field 306 may establish that the network resource 104 allows one of: (a) "public access" in which any network terminal 200 of the network resource access system 100 can communicate with the network resource 104; (b) "private access" in which only members (e.g. employees) of the enterprise associated with the network resource 104 can communicate with the network resource 104; and (c) "authorized access" in which only particular network terminals 200 can communicate with the network resource 104. Other embodiments may incorporate other access schemes.

If the user access level field 306 specifies "authorized access" for a network resource 104, preferably the user access level field 306 includes a sub-field which lists the names of the network terminals 200 or users that are authorized to access the network resource 104, and a sub-field which includes an authorization password which the identified network terminals 200 must provide in order to access the network resource 104. Other embodiments may incorporate other systems to verify user credentials, such as, for example, an LDAP-based system in an enterprise environment. If the user access level field 306 specifies "private access" for a network resource 104, preferably the user access level field 306 includes a sub-field which lists the network address of the network terminals 200 or the user names which are deemed to members of the enterprise.

It should be understood, however, that the user access level field 306 is not limited to identifying only the foregoing predefined user access levels, but may instead identify more than one of the predefined user access levels, or other user access levels altogether. For instance, the user access level field 306 may identify that the associated network resource 104 allows both private access to all employees of the enterprise running the network resource 104, and authorized access to other pre-identified network terminals 200. Further, the user access level field 306 may also include one or more sub-fields (not shown) which provide additional restrictions/permissions on the type of communications access which the network terminals 200 are allowed to have in regards to the associated network resource 104. For instance, the user access level sub-fields may limit the hours of operation of the network resource 104, or may place restrictions on the type of access limitations on a per-user basis, or per-group basis. Other variations on the type of access will be readily apparent, and are intended to be encompassed by the scope of the present invention.

Preferably, each resource record 300 includes an information field 308 which provides information on the network resource 104, such as data handling capabilities, resource pricing. Each resource record 300 also preferably includes a location information field 309, such as, for example, geographical co-ordinates that refer to the physical location. This latter parameter is particularly advantageous for use with mobile network terminals 200, such as a wireless-enabled personal data assistant or an e-mail-enabled wireless telephone, since it allows the network terminal 200 to identify the nearest one of a plurality of available network resources 104.

Each resource record 300 can also include a pseudo-name field 310, a username/password field 312 and a network driver identifier field 314. The pseudo-name field 310 contains a resource pseudo-name which identifies the network resource 104 to the network terminals 200. Preferably, the pseudo-name is a network alias that identifies the physical location and properties of the network resource 104, but does not identify the network address of the resource 104. Further, preferably each pseudo-name uniquely identifies one of the network resources 104, however a group of the network resources 104 may be defined with a common pseudo-name to allow communication with a group of network resources 104. This latter feature is particularly advantageous since it allows the administrator of an enterprise associated with the group of network resources to dynamically allocate each network resource 104 of the group as the demands for the network resources 104 or maintenance schedules require.

In addition, preferably the resource record 300 includes a plurality of the pseudo-name fields 310 to allow the administrator of the associated network resource 104 to update the name assigned to the network resource 104, while also retaining one or more previous pseudo-names assigned to the network resource 104. As will be explained, this feature is advantageous since it allows the administrator to update a resource name without the risk that network terminals 200 using a prior pseudo-name will be unable to locate or communicate with the network resource 104.

The username/password field 312 contains a unique username and password combination which allows the administrator of the associated network resource 104 to prevent authorized access and alteration to the data contained in the resource record 300. Preferably, each resource record 300 also includes an e-mail address field (not shown) which the network resource access system 100 uses to provide the administrator of the associated network resource 104 with a notification e-mail message when a message is successfully transmitted to the network resource 104.

The driver identifier field 314 contains a resource driver identifier which is used in conjunction with the driver database 122 to provide the network terminals 200 with the appropriate resource driver for communication with the network resource 104. The driver database 122 includes resource drivers which allow software applications installed on or accessed by the network terminals 200 to communicate with the network resources 104. As will be explained below, in order for a network terminal 200 to communicate with a selected network resource 104, the network terminal 200 first downloads driver application data from the administration server 108 over the communications network 112. The network terminal 200 may also download the appropriate resource driver from the driver database 122 (via the authorization server 110 over the communications network 112), and then allow the authorization server 110 to configure the downloaded resource driver in accordance with the access level field 306 of the resource record 300 associated with the selected network resource 104. Preferably, each resource driver includes a resource driver identifier which allows the authorization server 110 to identify the resource driver which the network terminal 200 has downloaded. It is also recognised that the driver database 122 can contain generic drivers to permit appropriate consumption/processing of the application data by the receiving network resource 104. The following is only one example of driver configuration of the network terminal 200 used to configure the application data for subsequent consumption/processing by the target network resource 104. It is also recognised that the network terminals 200 and the corresponding network resources 104 could be preconfigured with a generic driver to provide for preconfigured transmission and consumption/processing of the application data.

The example dynamically configurable driver application will now be discussed in association with FIG. 2. As discussed above, the DISC 210 of the network terminal 200 includes data which, when loaded into the RAM 212 of the network terminal 200, comprise processor instructions for the CPU 208. As shown, the downloaded driver application data defines in the RAM 212 a memory object comprising a driver application 400. The driver application 400 includes a generic resource driver 402 and a wrap-around resource driver layer 404. The generic resource driver 402 allows the network terminal 200 to communicate with a variety of different network resources 104, however the generic resource driver 402 typically will not provide the network terminal 200 with access to all the features and capabilities of any particular network resource 104. If the network terminal 200 requires additional features not implemented with the generic resource driver 402, the appropriate resource driver may be downloaded from the driver database 116, as mentioned above.

The wrap-around driver layer 404 includes an application communication layer 406, a driver administrator layer 408, and a data transmitter layer 410. The application communication layer 406 is in communication with the resource driver 402 (generic or network resource specific) and the application software installed on the network terminal 200, and is configured to transmit user application data between the application software and the resource driver 402. The driver administrator layer 408 communicates with the resource registry 106 over the communications network 112 to ensure that the driver application 400 is properly configured for communication with the selected network resource 104. The data transmitter layer 410 is in communication with the resource driver 402 and is configured to transmit the data output from the resource driver 402 over the communications network 112 to the selected network resource 104, via the network interface 202. Although the driver application 400 and its constituent component layers are preferably implemented as memory objects or a memory module in the RAM 212, it will be apparent that the driver application 400 may instead be implemented in electronic hardware, if desired.

Returning to FIG. 1, the registration database 124 of the resource registry 106 includes user records each uniquely associated with a user of a respective network terminal 200 upon registration with the network resource access system 100. The user record may identify the name of the registered user, a post office address and an e-mail address. In addition, each user record specifies a unique password which the registered user must specify in order to update the user's user record, and to obtain access to network resources 104 configured for "authorized access". The user record may also include additional information specifying default options for the network resource access system 100. For instance, the user may specify that the network resource access system 100 should provide the user with an acknowledgement e-mail message when a message is successfully transmitted to a selected network resource 104. The user may also specify an archive period for which the network resource access system 100 should archive the message transmitted to the selected network resource 104. This latter option is advantageous since it allows the user to easily transmit the same message to multiple network resources 104 at different times, and to periodically review transmission dates and times for each archive message.

The administration server 108 is in communication with the resource database 120 and the registration database 124. The administration server 108 provides administrators of the network resources 104 with access to the records of the resource database 120 to allow the administrators to update the network address field 302, the resource type field 304, the user access level field 306, the resource information field 308, the location information field 309, the pseudo-name field 310, the username/password field 312 and/or the driver identifier field 314 of the resource record 300 for the associated network resource 104. As will become apparent, this mechanism allows network administrators to change, for example, the network address and/or the restrictions/permissions of the network resources 104 under their control, or even the network resource 104 itself, without having to notify each network terminal 200 of the change. The administration server 108 also provides controlled access to the registration database 124 so that only the user of the network terminal 200 which established the user record can update the user record.

Where the username/password field 312 has been completed, the administration server 108 is configured to block access to the resource record 300 until the administrator provides the administration server 108 with the correct username/password key. This feature allows the resource administrator to make adjustments, for example, to pricing and page limit, in response to demand for the network resources 104, and to make adjustments to the restrictions/permissions set out in the user access level field 306 and the resource information field 308 and thereby thwart unauthorized access to the network resources 104.

The authorization server 110 is in communication with the resource database 120 and the driver database 122 for providing the network terminals 200 with the resource drivers 402 appropriate for the selected network resources 104. Preferably, the authorization server 110 is also configured to configure the driver application 400 for communication with the selected network resource 104, by transmitting the network address of the selected network resource 110 to the data transmitter layer 410 over a communications channel secure from the user of the network terminal 200 so that the network address of the network resource 104 is concealed from the user of the network terminal 200. In the case where the communications network 112 comprises the Internet, preferably the secure communications channel is established using the Secure Sockets Layer ("SSL") protocol. It is also recognised that the authorization server 110 can be used to provide the network terminal 200 with a list of available network resources 104 that are accessible by the user of the network terminal 200 and also are appropriate for consumption/processing of the particular application data 221 as desired by the network terminal 200 user (e.g. specific network resources 104 may provide certain desired processing features while others may not). Examples of specific processing/consumption features of the network resources 104 that can be specified by the network terminal 200 can include features such as but not limited to: colour, print quality, print resolution, viewing resolution, processing cost, location of the resource 104, etc.

In addition to the network terminal 200, the network resource 104, the resource registry 106, the administration server 108, the authorization server 110, and the communications network 112, the network resource access system 100 can also include optionally a transaction server 126 and an archive server 128. The transaction server 126 is in communication with the authorization server 110 for keeping track of each data transfer between a network terminal 200 and a network resource 104. For each transmission, preferably the transaction server 126 maintains a transmission record identifying the network terminal 200 which originated the transmission, the network resource 104 which received the transmission, and the date, time and byte size of the transmission.

The archive server 128 is configured to retain copies of the data transmitted, for a specified period. As discussed above, the user of a network terminal 200 specifies the requisite archive period (if any) for the data transmission, upon registration with the network resource access system 100. Preferably, the administration server 108 provides controlled access to the transaction server 126 and the archive server 128 so that only the user of the network terminal 200 which originated transmission of the data is allowed access to the transmission record associated with the transmission.

Figure 4A:
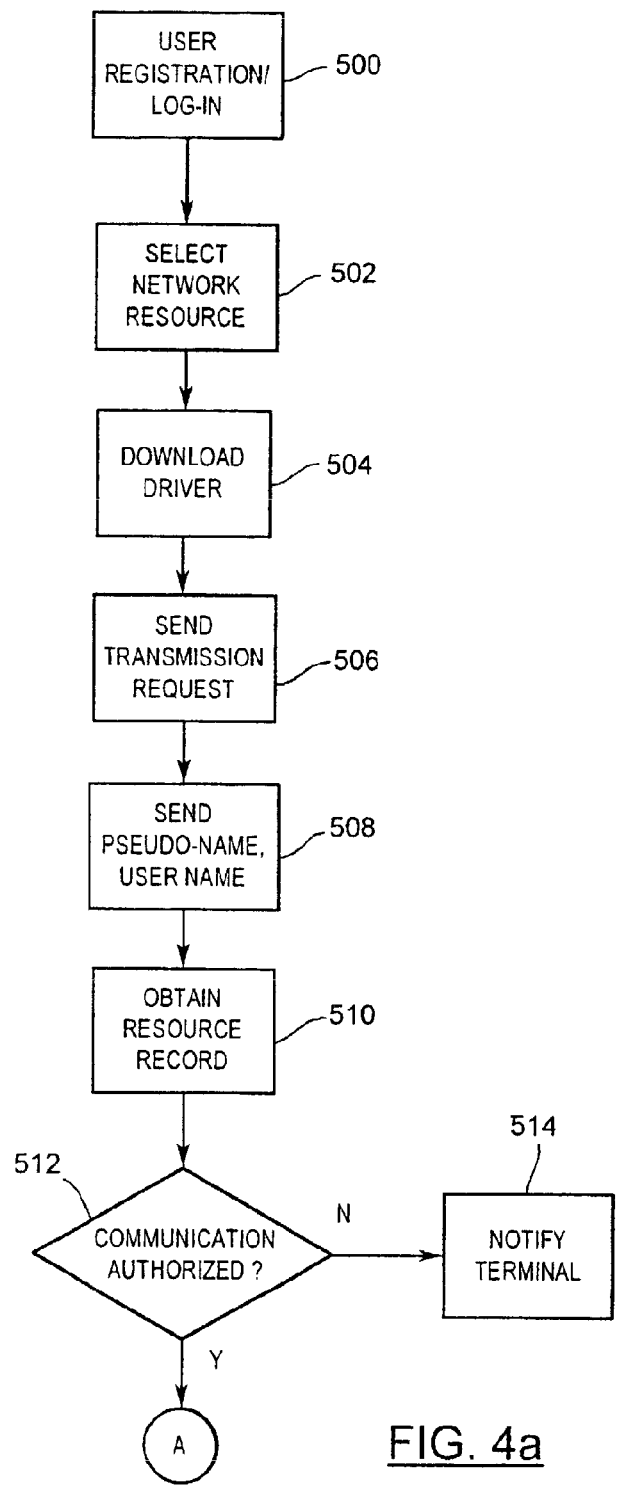
FIG. 4 is a flow chart depicting the method of operation of the network resource access system.
Figure 4B:
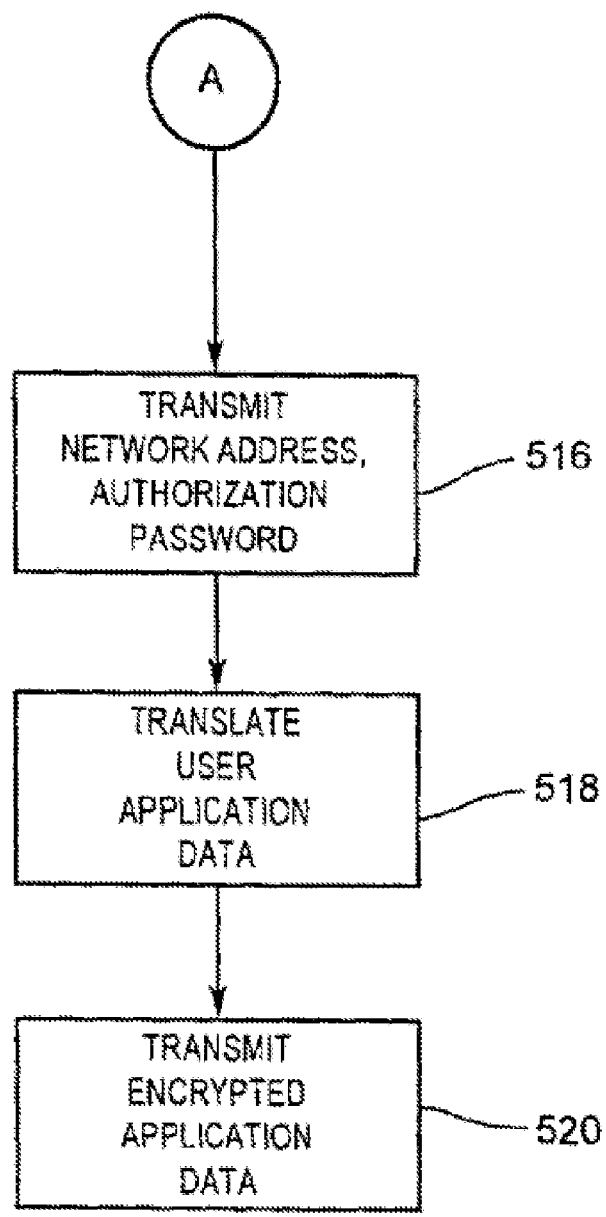

The process by which a user of a network terminal 200 can communicate with a network resource 104 is now described by example with reference to FIG. 4. The following discussion presupposes that the user of the network terminal 200 has downloaded or otherwise has a suitable driver application 400 (e.g. from the administration server 108 over the communications network 112). At step 500, the user of a network terminal 200 decides whether to log in to the network resource access system 100. As discussed above, if the user registers with the network resource access system 100 and subsequently logs in to the network resource access system 100 (by providing the authorization server 106 with the user's assigned password), the user will have access to any network resources 104 which have "authorized access" as the user access level and which have identified the registered user as a user authorized to access the network resource 104. If the user does not register or fails to log in to the network resource access system 100, the user will only have access to network resources 104 which have established "public access" as the user access level.

At step 502, the user selects a network resource 104 by querying the administration server 108 for a list of available network resources 104. Alternately, the user may postpone selection of a network resource 104 until initiation of the transmission command. The network user query may be based upon any desired criteria, including print turn-around time and page size (where the target network resource 104 is a printer), price, and geography. In addition, the user may provide the administration server 108 with the geographical coordinates of the user to determine the user's nearest network resources. The user may provide its geographical coordinates through any suitable mechanism known to those skilled in the art, including latitude/longitude co-ordinates, GPS, and wireless triangulation. Other methods of obtaining geographical coordinates may also includes Wi-Fi based services, such as those offered by Skyhook Wireless.

If the user requested a list of available network resources 104, the user is provided with a list of pseudo-names associated with each network resource 104 satisfying the designated search criteria. As discussed above, if the user logged in to the network resource access system 100, the pseudo-name list will include both "public access" network resources 104 and "authorized access" network resources 104 with which the user has been authorized to communicate. Also, if the user is member of an enterprise having network resources 104 registered with the network resource access system 100, the pseudo-name list will also identify network resources 104 which have been registered by the enterprise for "private access". Otherwise, the pseudo-name list will only identify network resources 104 registered for public access. Upon receipt of the resource list, the user selects a network resource 104 from the list.

At step 504, the administration server 108 queries the network user's network terminal 200 for the resource driver identifier of the resource driver 402 configured on the network terminal 200, and then compares the retrieved resource driver identifier against the resource driver identifier specified in the network driver identifier field 314 of the resource record 300 associated with the selected network resource 104 to determine whether the driver application 400 has been configured with the appropriate resource driver 402 for communication with the network resource 104. If the network terminal 200 has not been configured with the appropriate resource driver 402, the administration server 108 prompts the user's network terminal 200 to download the necessary resource driver 402. As will be apparent, the downloaded resource driver 402 becomes part of the driver application 400.

When the user of the network terminal 200 is ready to communicate with the selected network resource 104, the user of the network terminal 200 transmits a transmission request via its application software to the driver application 400, at step 506. If the user did not select a network resource 104 at step 502, the application communication layer 406 of the driver application 400 contacts the administration server 108 over the communications network 112 and prompts the user to select a network resource 104, as described above. Once a network resource 104 is selected, and the appropriate resource driver 402 is installed, the application communication layer 406 notifies the driver administrator layer 408 of the transmission request.

At step 508, the driver administrator layer 408 provides the authorization server 110 with the transmission request and identifies the selected network resource 104, by transmitting to the authorization server 110 the pseudo-name assigned to the selected network resource 104. If the user of the network terminal 200 has registered and logged in to the network resource access system 100, the driver administrator layer 408 also provides the authorization server 110 with the registered user's name.

The authorization server 110 then queries the resource database 120 with the received pseudo-name for the resource record 300 associated with the pseudo-name, at step 510. The authorization server 110 then extracts the user access level from the user access level field 306 of the retrieved resource record 300, and determines whether the network terminal 200 is authorized to communicate with the selected network resource 104, at step 512. As will be apparent from the foregoing discussion, if the user access level field 306 specifies "public access" for the network resource 104, the network terminal 200 will be automatically authorized to communicate with the network resource 104.

However, if the user access level field 306 specifies "private access" for the network resource 104, the authorization server 110 determines the network address of the network terminal 200 from the transmission request transmitted by the network terminal 200, and then queries the user access level sub-field with the terminal's network address to determine whether the network terminal 200 is authorized to communicate with the network resource 104. In the case where the communications network 112 comprises the Internet, the authorization server 110 can determine the network terminal's network address from the IP packets received from the network terminal 200. On the other hand, if the user access level field 306 specifies "authorized access" for the network resource 104, the authorization server 110 queries the user access level sub-field with the user's name to determine whether the network terminal 200 is authorized to communicate with the network resource 104.

If the query at step 512 reveals that the network terminal 200 is not authorized to communicate with the network resource 104, at step 514 the authorization server 110 provides the network terminal 200 with a notification that the network terminal 200 is not authorized for communication with the selected resource 104. However, if the query at step 512 reveals that the network terminal 200 is authorized to communicate with the network resource 104, the authorization server 110 queries the network address field 302 of the resource record 300 associated with the network resource 104 for the network address of the network resource 104. The authorization server 110 then establishes a secure communications channel with the driver administrator layer 408, and then transmits the network address to the driver administrator layer 408 over the secure communications channel, at step 516.

Also, if the user access level field 306 specifies "authorized access" for the network resource 104, and the network terminal 200 is authorized to communicate with the network resource 104, the authorization server 110 queries the user access level sub-field for the authorization password assigned to the network resource 104, and then transmits the authorization password to the driver administrator layer 408 over the secure communications channel, together with the network address. In the case where the communications network 112 comprises the Internet, preferably the authorization server 110 establishes the secure communications channel using a Secure Sockets Layer ("SSL") protocol. Since the network address and the authorization password are transmitted over a secure communications channel, this information is concealed from the user of the network terminal 200.

Preferably, the authorization server 110 also extracts the resource driver identifier from the resource identifier field 314 of the resource record 300, and determines whether the network terminal 200 is still properly configured for communication with the network resource 14. If the network terminal 200 no longer has the correct resource driver 402, the authorization server 110 queries the driver database 122 for the correct resource driver 402, and prompts the user of the network terminal 200 to download the correct resource driver 402. This driver configuration verification step may be performed concurrently or consecutively with the network address providing step described in the preceding paragraph.

In addition, the administration server 108 queries the registration database 124 to determine whether the user of the network terminal 200 registered with the network resource access system 100. If the user registered with the network resource access system 100 and specified that the archive server 128 should maintain archival copies of data transmissions, the administration server 108 transmits the network address of the archive server 128 to the driver administrator layer 408. As a result, when the user of the network terminal 200 issues a data transmission command, the driver application 400 will transmit the user application data to the selected network resource 104 and to the archive server 128.

At step 518, the application communication layer 406 passes the application data received from the application software to the resource driver 402 for translation into a format suitable for processing by the selected network resource 104. Meanwhile, the driver administrator layer 408 interrogates the network resource 104, using the received network address, to determine whether the network resource 104 still resides at the specified network address, is operational and is on-line.

If the interrogated network resource 104 resides at the specified network address, is operational and is on-line, the resource driver 202 passes the translated application data to the data transmitter layer 410 of the driver application 400. Preferably, the data transmitter layer 410 compresses and encrypts the translated application data upon receipt. The data transmitter layer 410 also receives the network address of the network resource 104 from the driver administrator layer 408, adds the network address data to the compressed, encrypted data, and then transmits the resulting data over the communications network 112 to the network resource 104 at the specified network address, at step 520.

Preferably, the data transmitter layer 410 also transmits details of the transmission to the transaction server 126, such as the selected network resource 104 and the byte size of the transmission. Upon receipt of the transmission details, preferably the administration server 108 queries the resource database 120 and the user registration database 124 for the e-mail address of the resource administrator and the e-mail address of the user of the network terminal 200, if provided, and then transmits an email message indicating completion of the transmission.

If the user access level field 306 specifies "authorized access" for the network resource 104, the data transmitter layer 410 also receives the authorization password for the network resource 104 from the driver administrator layer 408, and transmits the authorization password (as part of the compressed, encrypted data) to the network resource 104.

If the user access level field 306 specifies "public access" for the network resource 104, preferably the network resource 104 is accessible through a local server which serves to queue, decrypt and decompress the application data, and extract the network address data, and then transmit the decompressed application data to the appropriate network resource 104. Alternately, the network resource 104 itself may be configured for direct communication over the communications network 112, such as an IPP-capable printer, so that the network resource 104 is able to process the application data directly.

If the user access level field 306 specifies "authorized access" for the network resource 104, preferably the network resource 104 is accessible through a local server which serves to queue, decrypt and decompress the application data, and extract the network address data and authorization password, and then transmit the application data to the appropriate network resource 104 if the received authorization password is valid.

If the user access level field 306 specifies "private access" for the network resource 104, typically the network resource 104 will be located behind a firewall. Accordingly, the proxy server 114 associated with the network resource 104 will receive the application data, and transfer the application data to the proxy server queue. The polling server 116 associated with the network resource 104 will poll the proxy server 114 to determine the status of the queue. Upon receipt of a polling signal from the polling server 116, the proxy server 114 transmits any queued application data from the proxy server queue, through the firewall, to the polling server 116. The polling server 116 then extracts the network address from the received application data, and transmits the application data to the appropriate server 118 or network resource 104 for processing.

As will be apparent from the foregoing discussion, regardless of the user class defined for a network resource 104, if a resource administrator relocates a network resource 104 to another network address, and/or changes the device type and/or restrictions/permissions associated with the network resource 104, the resource administrator need only update the resource record 300 associated with the network resource 104 to continue communication with the network resource 104. Subsequently, when a user attempts communication with the network resource 104 using the original pseudo-name, the authorization server 110 will provide the administrator layer 408 with the updated network address of the network resource 104, or prompt the user to download the appropriate resource driver 402, assuming that the network terminal 200 is still authorized to communicate with the network resource 104.

Further, if the user access level field 306 specifies "authorized access" for the network resource 104 and the resource administrator desires to change the pseudo-name and authorization password associated with the network resource 104, the resource administrator need only update the pseudo-name and authorization password provided on the resource record 300. Subsequently, when a user of a network terminal 200 initiates communication with the network resource 104 using the original pseudo-name, the authorization server 110 scans the resource records 300 for occurrences of the original pseudo-name. After locating the appropriate resource record 300, the authorization server 110 provides the driver administrator layer 408 with the updated pseudo-name and authorization password of the network resource 104, provided that the network terminal 200 is still authorized to communicate with the network resource 104. A network terminal 200 which is not authorized to communicate with the network resource 104 will not receive the updated pseudo-name and authorization password from the authorization server 110 and, consequently, will not be able to communicate with the network resource 104, even if the user of the network terminal 200 knew the network address for the network resource 104.

Figure 5:
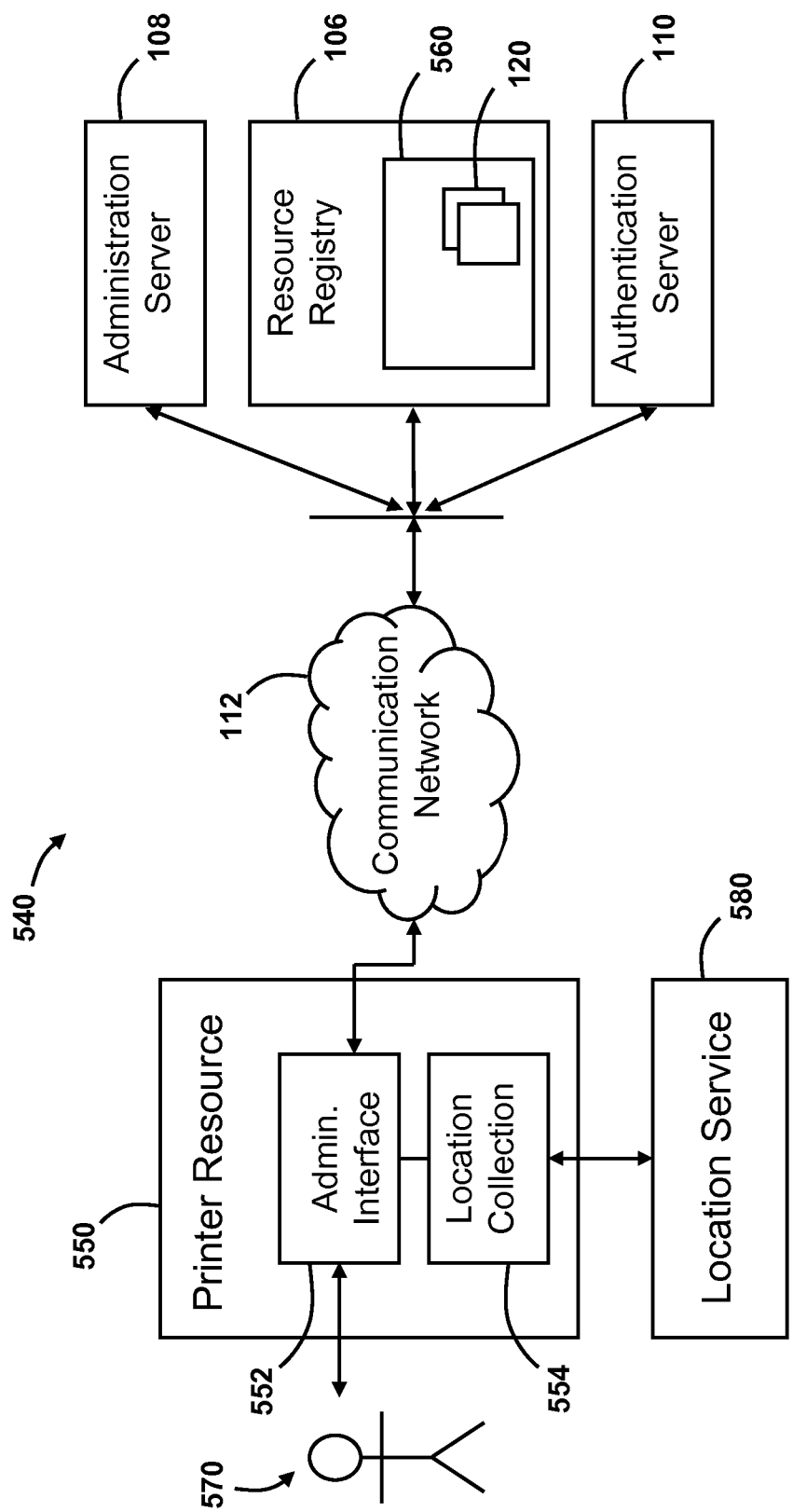
FIG. 5 is a schematic of an embodiment of a system showing a printer resource comprising an administration interface and a location collection module for providing location information to the resource registry.

Referring now to FIG. 5, shown is a schematic of an embodiment of a network resource access system 540 showing a printer resource 550 comprising an administration interface 552 and a location collection module 554. Printer resource 550 is connected by communication network 112 to resource registry 106, administration server 108 and authorization server 110.

Resource registry 106 comprises a database server 560 that facilitates storage and retrieval of data stored in resource database 120. As described with respect to FIG. 3, resource database 120 includes resource records 300 that identify location information associated with network resources 104 to specify a physical location, typically using geographical coordinates. Resource database 120 has a unique identifier for each resource record associated with network resources 104. Past approaches have relied upon an administrator either manually entering geographical coordinate data or manually entering street address information and then providing the data to the administration server 108 or resource registry 106. In some cases, administration server 108 would have to convert the provided location information to geographical coordinate information to store the location information in resource database 120. These approaches are prone to manual entry errors and may also involve transcribing location information from one system, such as GPS receiver, into the network resource access system. It is also an additional administrative burden for configuring and maintaining location information for network resources 104. In addition, address information may not be accurate or helpful, especially when the address is for a large building that contains multiple network resources.

Network resource access system 540 shows a network resource in the form of printer resource 550. Printer resource 550 preferably comprises a printer that produces hard copy documents from electronic files, but other embodiments may employ virtual paper devices, such as e-readers, or public displays. The printer may contain sufficient hardware and software to carry out all tasks for printer resource 550, such as, for example, a network printer, or may be connected to the computer as a peripheral device. In computer connected embodiments, the computer may be a general purpose personal computer or a dedicated print server device, such as a PrintConnect device offered by PrinterOn. In either the computer connected or standalone printer embodiments, printer resource 550 comprises a microprocessor and computer memory. The computer memory may include volatile storage, for example, various known RAM memory known to a person skilled in the art, and also non-volatile memory, for example, flash ROM-type memory or magnetic memory. Administration interface 552 and location information collection module 554 may be implemented as software that is stored in memory and executed by the microprocessor.

Printer resource 550 comprises an administration interface 552 that interfaces with any one or combination of administration server 108, authentication server 110 and resource registry 106 over communication network 112. Administration interface 552 obtains location information data from location collection module 554. Administration interface 552 transmits the location information over communication network 112 for storage in resource registry 106. Administration interface 552 may also provide data related to the status of printer resource 550, information about print jobs submitted to printer resource 550, login/username details to any one of the resource registry 106, administration server 108 and authentication server 110. Other data provided may also include a globally unique hardware identifier that is provisioned prior to deployment that may be used for authentication instead of a username and password. Administration interface 552 may operate autonomously or through instruction from systems administrator 570.

Administration interface 552 may provide a user interface for a systems administrator 570. In some embodiments, the user interface may comprise buttons and the display on the printer itself. For example, a key pad on the printer may allow an administrator to instruct the printer resource to update the printer resource registry with the printer's current location. In embodiments where the printer is connected as a peripheral to a computer, the user interface may be run as an application on the computer that allows the systems administrator to enter and review parameters for the printer resource 550. In still other embodiments, administration interface 552 may comprise a web server that allows a systems administrator to connect to the user interface through a web browser on another network connected computer. In still other embodiments, administration interface 552 may comprise a web page that is served by a web server of administration server 108 over communication network 112. Systems administrator 570 preferably authenticate their user credentials with authentication server 110 to obtain permission to populate or update data for the printer resource 550 stored in resource registry 106.

Location information collection module 554 operates to collect location information from a location service 580 to provide location information data to administration interface 552. The location information is preferably in the form of geographical coordinate data, such as, for example, Global Positioning System ("GPS") coordinate data specifying latitude, longitude and elevation. In some embodiments, location service 580 may comprise the GPS satellite network and the location information collection module 554 may comprise a GPS transceiver for obtaining GPS coordinate data. Other IP address-based location information or services may also be used to provide additional location data that may be used to confirm or verify location information from other services or sources.

Location information may also be obtained based on wireless site survey data obtained through a wireless network interface card on the printer or attached computer. Wireless site survey data typically includes MAC addresses of other nearby network interface cards, SSID-type information that identifies nearby wireless base stations, and the signal power associated with each. The wireless site survey data may then be submitted to location service 580 that may then return GPS-type coordinate data corresponding to the physical location of the wireless network interface card. An example of a location service based on this type of wireless data is offered by Skyhook Wireless.

If printer resource 550 includes a cellular modem for use with a mobile telephone network, location information may be obtained by location information collection module 554 using multiple cell towers to perform multilateration, trilateration or triangulation. Location information collection module may also implement a hybrid approach using any combination of GPS, IP address-based service, wireless data and cell tower location techniques. In many of the above approaches location information collection module 554 processes the location information data that is received before providing geographical coordinate data to administration interface 552.

Figure 6:
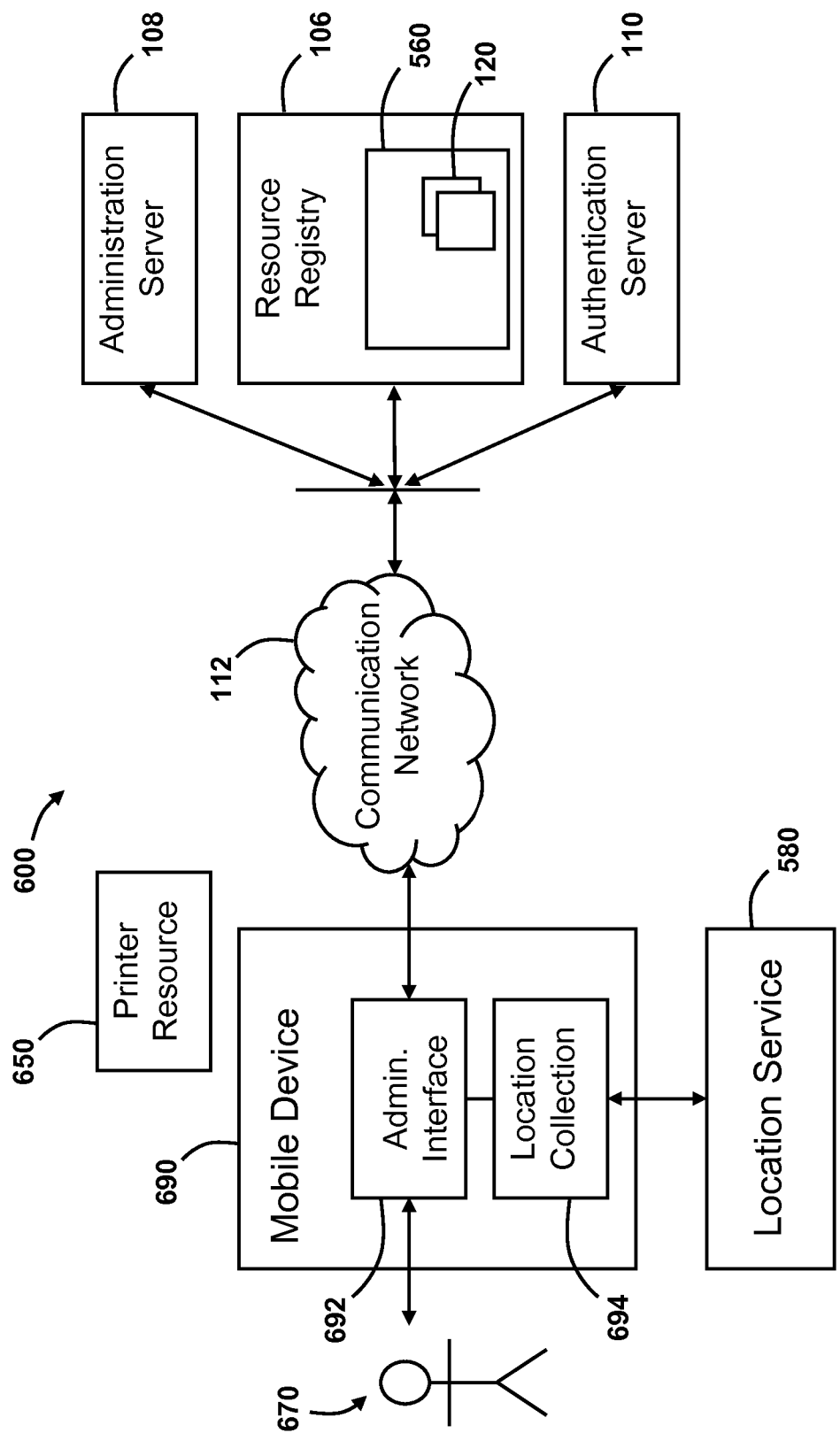
FIG. 6 is a schematic of an embodiment of a system showing a system administrator operating a mobile device in proximity to printer resource to update printer resource location information in the resource registry.

Referring now to FIG. 6, shown is a schematic of an embodiment of a system 600 showing a system administrator 670 operating a mobile device 690 in proximity to printer resource 650 to update printer resource location information. System 600 may be used to populate or update the location information stored in the resource database 120 of resource registry 106 when the printer resource 650 is not capable of providing location information by itself. Instead, location information is provided by mobile device 690 through administration interface 692 with location data provided by location information collection module 694. Preferably, operation of system 600 has system administrator 670 obtaining location information using mobile device 690 while being located near printer resource 650 to provide the most accurate location information for the printer resource.

Mobile device 690 may be a mobile telephone or other portable computing device with a wireless network interface. Other embodiments of mobile device 690, may not include a wireless network interface, and instead rely on transferring data to resource registry 106 only when connected to another device with a network connection. For example, a mobile device may be docked through a USB connection to a personal computer that may then upload location information data to the resource registry 106. Mobile device 690 also comprises a microprocessor and computer memory. The computer memory may include volatile storage, for example, various RAM memory known to a person skilled in the art, and also non-volatile memory, for example, flash ROM-type memory or magnetic memory. Administration interface 692 and location information collection module 694 may be implemented as software that is stored in memory and executed by the microprocessor.

Administration interface 592 and location information collection module 694 operate similarly to those described with respect to printer resource 550 in FIG. 6. Network interface of mobile device 690 may communicate with location service 580 to obtain location information that is provided to administration interface 592 that in turn updates location information of printer resource 650 in resource registry 106.

Since mobile device 690 is separate from printer resource 650 a user interface may be presented to systems administrator 670 to select an identifier for printer resource 650. After system administrator 670 provides account credentials that are verified with authorization server 110, the user interface of administration interface 592 may provide a list of printer resources that systems administrator 670 has permission to manage. Systems administrator 670 may simply select the identifier corresponding to printer resource 650 from the list of printer resources. The list of printers may contain meta data such as user-presentable names for printer resources; printer location description, such as "front desk, business center or $3^{rd}$ floor"; or physical address information, such as street or city names. Systems administrator 670 may also perform a search based upon any of this meta data or other parameters stored in resource database 120.

System 600 may also incorporate feedback from the printer resource 650 to ensure that mobile device 690 is actually located at printer resource 650. In some embodiments, after system administrator 670 selects printer resource 650, administration interface 592 may initiate printing a test page on printer resource 650. In some embodiments, test page printed on printer resource 650 may contain information that uniquely identifies printer resource 650. The test page may also encode the information in a 2-d bar code format, such as a QR code, that may be scanned using a camera integrated with mobile device 690. Mobile device 690 may extract the information from the bar code and submit this with the location information from location information collection module 694. Other embodiments may allow mobile device 690 to submit a geo-tagged photo of the bar code to administration server 108 that processes the bar code data and location information from the geo-tag in order to update the resource database 120 for printer resource 650 encoded in the bar code. Data encoded in the bar code may be encrypted so that it may only be processed by an appropriate administration server 108 or mobile device 690. Mobile device camera may also be used to upload a picture of the printer location to resource registry that would assist users of network resource access system in finding the physical location of a specific network resource.

Figure 7:
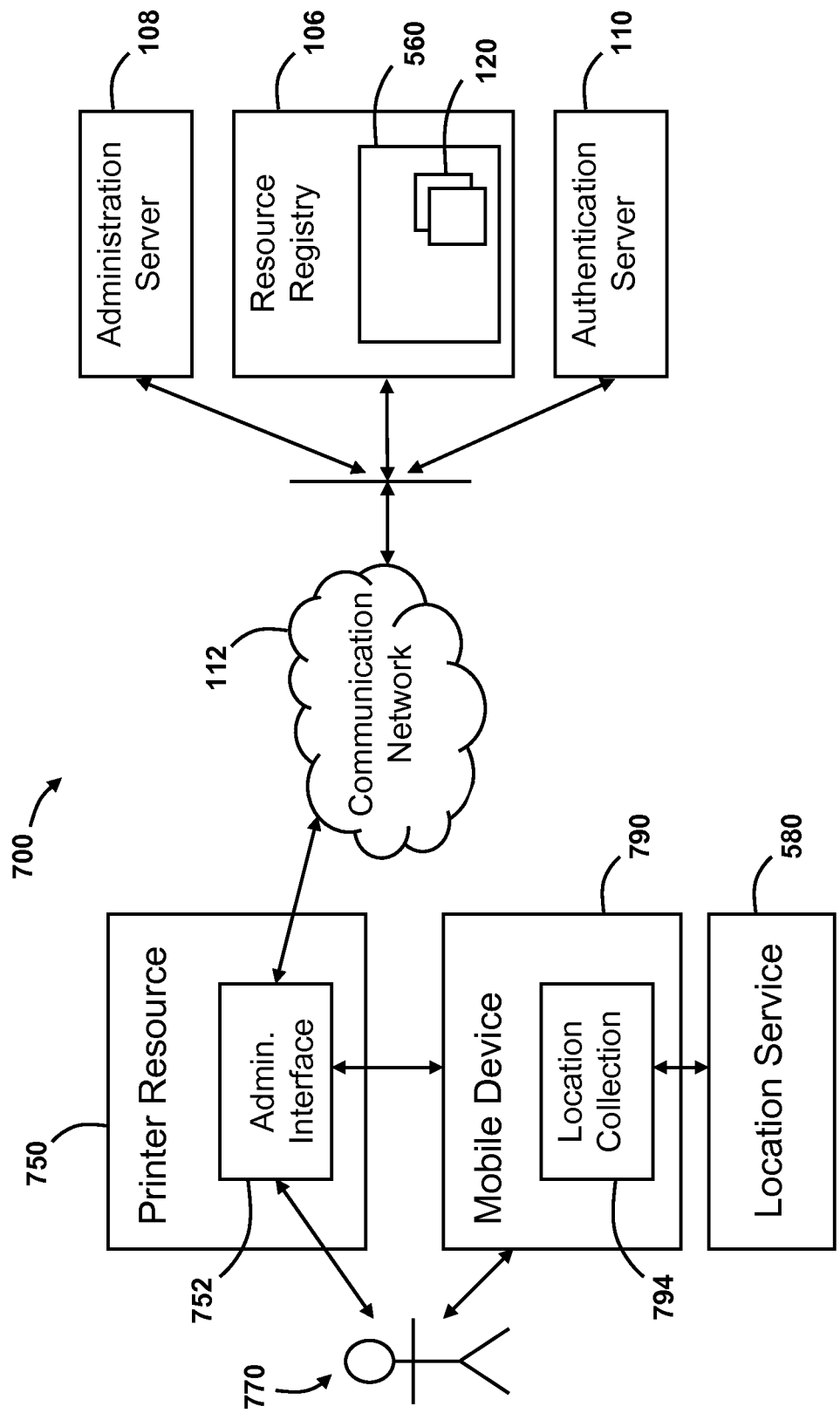
FIG. 7 is a schematic of an embodiment of a system showing a system administrator operating a mobile device in proximity to a printer resource that is running an administration interface on the printer resource to update printer resource location information in the resource registry.

Referring now to FIG. 7, shown is a schematic of an embodiment of a system 700 showing a system administrator 770 operating a mobile device 790 in proximity to printer resource 650 that is running administration interface 752 on printer resource 750 to update printer resource location information. In the system 700, printer resource 750 is capable of running administration interface 752, but printer resource 750 may lack any means for obtaining location information. Instead, location information may be provided by mobile device 790 to administration interface 752 that is operating on printer resource 750. Preferably, operation of system 700 has system administrator 770 obtaining location information using mobile device 790 while being located near printer resource 750 to provide the most accurate location information for the printer resource 750.

System administrator 770 operates mobile device 790 to obtain location information from location service 580 as described above. Mobile device 790 then provides the collected location information through the mobile device network interface to the administration interface 752. Mobile device 790 may provide user credentials along with location information that may be verified with authentication server 110 by administration interface. Administration interface 752 may submit the location information received from the mobile device 790 to resource registry 106 upon receipt or wait for approval and instructions from the systems administrator. Data transmitted may be a custom payload or XML message over a TCP connection, but may vary depending on the capabilities of the device.

In some embodiments, printer resource 750 may authenticate mobile device 790 before providing location information to the resource registry 106. Printer resource 750 may communicate with resource registry 106 to authenticate username and password credentials provided by the mobile device 790.

Figure 8:
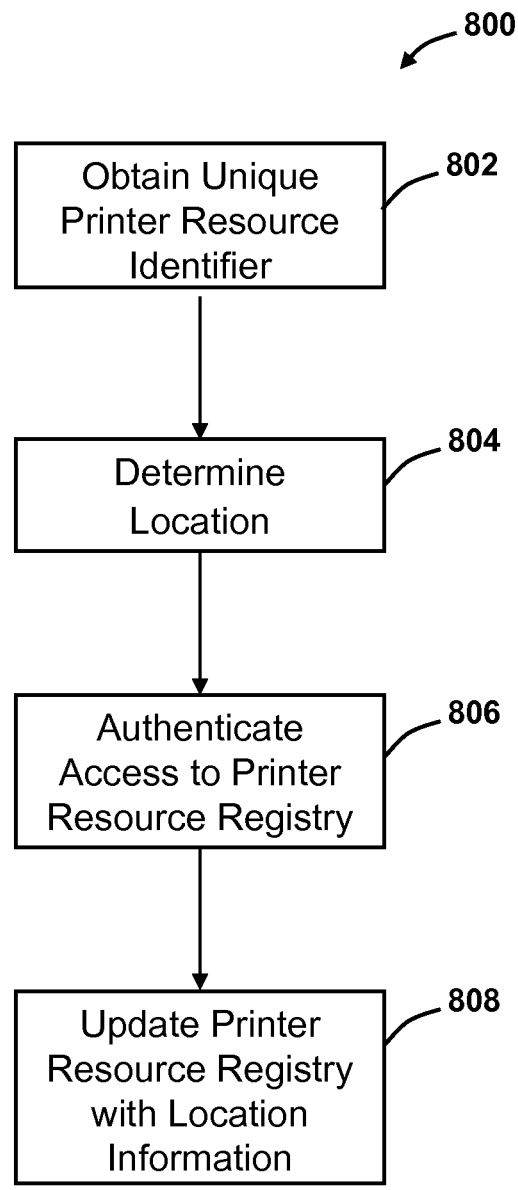
FIG. 8 is a flow chart of a method for updating printer location information stored at the resource registry.

Referring now to FIG. 8, shown is a flow chart of a method 800 for updating printer location information stored at a printer registry. Method 800 may be performed by one or more computer systems having a microprocessor and memory. Different steps may be performed on different computer systems and information may be transmitted between computers system over communication networks in order to complete the steps of method 800. For example, FIG. 7 shows printer resource 750 and mobile 790 each performing various functions to provide information over communication network 112 to resource registry 106.

At step 802, a unique printer resource identifier is obtained. The printer resource identifier is unique in order to identify a specific resource record 300 to be updated in resource database 120 of resource registry 106. In some embodiments, pseudo-name 310 may be used as a unique printer resource identifier, or as a direct mapping to the unique identifier. In other embodiments, the unique identifier may be a number that is assigned to the printer resource by the resource registry 106 or administration server 108.

Preferably, an administration interface obtains the unique identifier. In embodiments where the administration interface is operating on the printer resource itself, such as in FIG. 5 and FIG. 7, administration interface 552, 752 may obtain the unique identifier directly from printer resource 550, 750 or the administration interface 552, 752 may have stored a copy of the unique identifier when it was assigned or selected upon printer resource 550, 750 joining the network resource access system.

In other embodiments, administration interface may provide a user interface that allows a systems administrator to enter the unique identifier. This approach may be more suitable for operation on a mobile device, such as mobile device 690 in FIG. 6, or when printer resource includes a computer or server that connects to a printer peripheral, but is not limited to these applications. The user interface may provide a systems administrator with a list of printers that the system administrator is assigned to manage from which a printer resources may be selected. Information supplied in the list may contain additional metadata such as user presentable names for the printer resource, printer location description, such as "front desk, business center on $3^{rd}$ floor", or physical address information, such as a street address. The systems administrator could select a printer resource from the list or perform additional searches on the list using keywords that may appear in the metadata fields.

In some embodiments, determining location information at step 804 may be performed prior to or in conjunction with obtaining the printer resource identifier. The location information may then be used to search for printer resources within a certain radius or area of the system administrators location. Access to the list and search features may also require the systems administrator obtain authenticated access to the printer resource registry as described with respect to step 806. Thus, steps 802, 804 and 806 of method 800 may be performed in any order or together.

Some embodiments that rely on systems administrators identifying the printer resource may involve feedback from the printer resource. This allows the systems administrator to confirm that the appropriate printer resource is selected. This could be as simple as an indication on the printer display or a test page. The systems administrator may have to send data from the test page or display back to the administration server 108 or resource registry 106 so that the system can confirm that the systems administrator has identified the correct resource. This may take the form of entering a code from the test page into the user interface of administration interface or the use of 2-d bar codes as described above.

At step 804, the location of the printer resource is determined. As described above, geographical coordinate location information may be obtained from a location service either on a mobile device or the printer resource, including a personal computer or server connected to the printer; dedicated printer server hardware; or the printer itself. Multiple location services may be used in determining the geographical coordinate location information to help provide a more accurate location. Location information may be provided by an external device, such as a dedicated GPS or mobile phone, that then provides the location information to be used by other steps of method 800.

Prior to updating the printer resource registry at step 808, access to the printer resource registry may be authenticated at step 806. Authentication may also be required to obtain non-public data associated with a printer resource, such as, for example, the meta data in the printer lists described above. Authentication is typically performed by verifying user credentials with those stored by the printer resource registry or associated system. For example, a system administrator may provide a user name and password to the authentication server 110 in order to update resource records 300 in resource database 120. Other authentication approaches known to those skilled in art may also be used, but typically, systems that rely on knowledge of a shared secret between the two systems are used. Although authentication has been described as an interactive step involving a system administrator, other embodiments may be autonomous and involve securely storing the shared secret in the hardware device used to access the printer resource registry. For example, a printer resource may periodically obtain location information, and upon noticing a change in location may initiate authentication with the printer resource registry in order to provide updated location information.

At step 808, the printer resource registry is updated with location information. The location information is submitted to the printer resource registry using the unique identifier of the resource record associated with the printer resource obtained in step 802 and the location information obtained in step 806. Authentication information may also be submitted along with the updated location information and the printer resource registry may determine whether the update is authorized depending on the authentication credentials provided. If the update is approved, the resource record associated with the unique printer resource identifier may have it's location information field populated with the location information.

Figure 9:
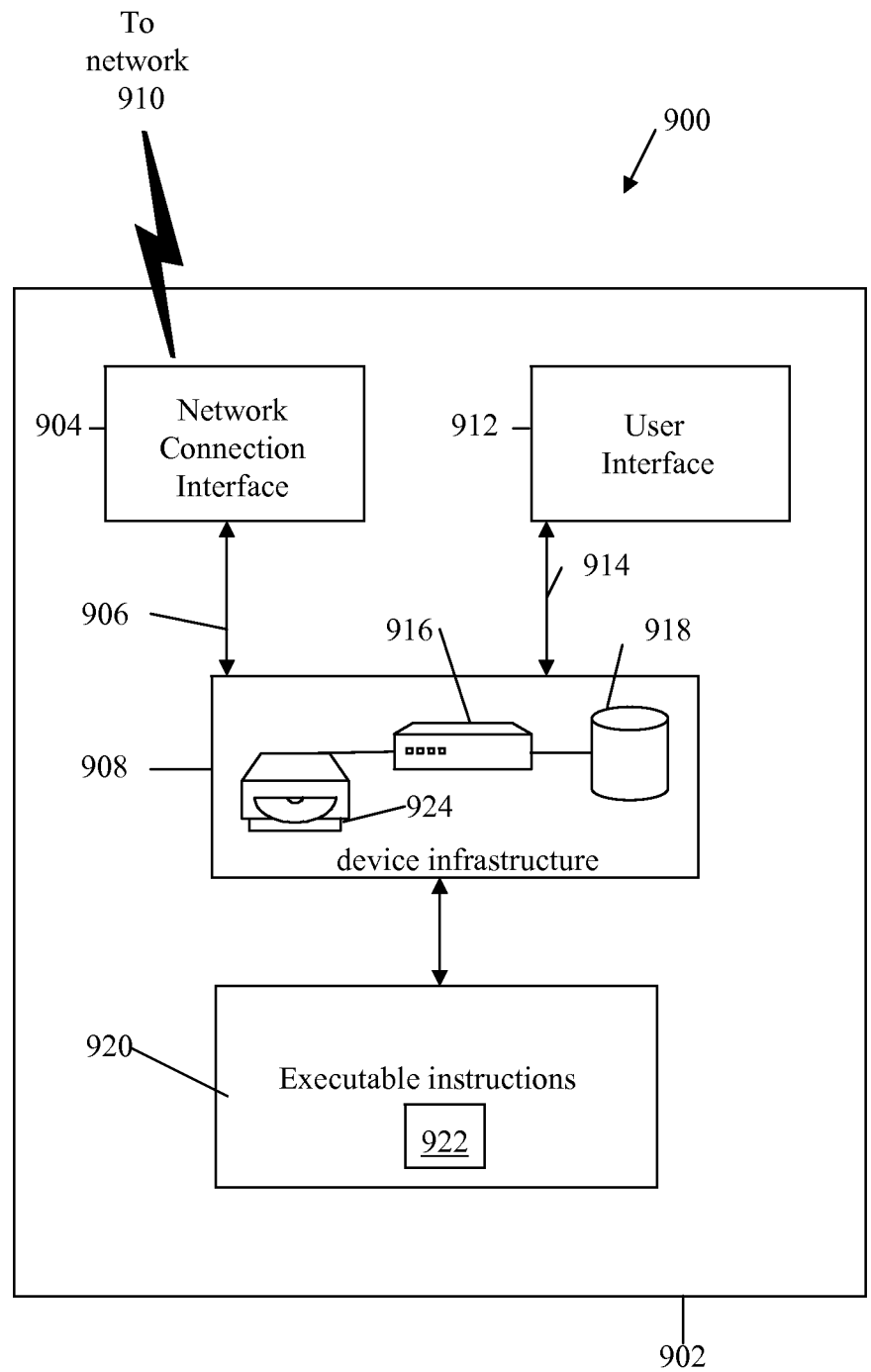
FIG. 9 is a block diagram showing a computing device in a host system.

Referring to FIG. 9, shown is a block diagram of a computing device 902 in a host system 900. Mobile devices, various servers, and printer resources, such as those shown in FIGS. 5-7, may be implemented as an embodiment of host system 900 comprising one or more computing devices 902. One or more computing devices 902 may also be used to carry out the method shown in FIG. 8.

Computing device 902 can include a network connection interface 904, such as a network interface card or a modem, coupled via connection 906 to a device infrastructure 908. The network connection interface 904 is connectable during operation of the devices 902 to the network 910 (e.g. an intranet and/or an extranet such as the Internet), which enables the devices 902 to communicate with each other (e.g. that of an mobile device 790 with printer resource 750) as appropriate. The network 910 can support the communication of the print requests for printer resources and administrative information, including, for example, print job data or location information.

Referring again to FIG. 9, the device 902 can also have a user interface 912, coupled to the device infrastructure 908 by connection 914, to interact with a user (e.g. system administrator—not shown). The user interface 912 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 908.

Referring again to FIG. 9, operation of the device 902 is facilitated by the device infrastructure 908. The device infrastructure 908 may include one or more computer processors 916 and can include an associated memory 918 (e.g. a random access memory). The computer processor 916 facilitates performance of the device 902 configured for the intended task (e.g. of the respective module(s) of the printer resource or mobile device) through operation of the network interface 904, the user interface 912 and other application programs/hardware 920 (e.g. location information collection module 922) of the device 902 by executing task related instructions. These task related instructions can be provided by an operating system, and/or software applications 920 located in the memory 918, and/or by operability that is configured into the electronic/digital circuitry of the processor(s) 916 designed to perform the specific task(s). Further, it is recognized that the device infrastructure 908 can include a computer readable storage medium 924 coupled to the processor 916 for providing instructions to the processor 916 and/or to load/update the instructions 920. The computer readable medium 924 can include hardware and/or software such as, by way of example only, magnetic disks, magnetic tape, optically readable medium such as CD/DVD ROMS, and memory cards. In each case, the computer readable medium 924 may take the form of a small disk, floppy diskette, cassette, hard disk drive, solid-state memory card, or RAM provided in the memory module 918. It should be noted that the above listed example computer readable mediums 924 can be used either alone or in combination.

Further, it is recognized that the computing device 902 can include the executable applications 920 comprising code or machine readable instructions for implementing predetermined functions/operations including those of an operating system (e.g. modules of printer resources or mobile devices to carryout method shown in FIG. 8). The processor 916 as used herein is a configured device and/or set of machine-readable instructions for performing operations as described by example above. As used herein, the processor 916 may comprise any one or combination of, hardware, firmware, and/or software. The processor 916 acts upon information by manipulating, analyzing, modifying, converting or transmitting information for use by an executable procedure or an information device, and/or by routing the information with respect to an output device. The processor 916 may use or comprise the capabilities of a controller or microprocessor, for example. Accordingly, any of the functionality of the host system 900 (e.g. modules) may be implemented in hardware, software or a combination of both. Accordingly, the use of a processor 916 as a device and/or as a set of machine-readable instructions is herein referred to generically as a processor/module for sake of simplicity. Further, it is recognised that the host system 900 can include one or more of the computing devices 902 (comprising hardware and/or software) for implementing the modules, as desired.

It will be understood in view of the above that the computing devices 902 of the network client devices, servers and network printer resources may be, for example, personal computers, personal digital assistants, mobile phones, network printers and servers, or combinations thereof. Further, it is recognised that each server-computing device 902, although depicted as a single computer system, may be implemented as a network of computer processors, as desired.

Further, it will be understood by a person skilled in the art that the memory/storage 918 described herein is the place where data can be held in a form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 918 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 918 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 918 can also be defined as an electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A physical printer for producing hardcopy documents at a specified location, the physical printer comprising:
a location information collection module on board the physical printer that collects coordinate-based location information; and
a processor and memory with instructions stored on the memory for execution by the processor to operate an administrator interface of the physical printer connected to the location information collection module to:
receive instructions instructing the physical printer to collect the coordinate-based location information of the physical printer using the location information collection module as update data for location information stored in a registry in a network access system and instructing the physical printer to update the location information of the physical printer in the registry over a communications network with the coordinate-based location information as a current location of the physical printer;
collect the coordinate-based location information using the location information collection module; and
in response to said instructions, submit the coordinate-based location information of the physical printer over the communications network for updating the location information stored in the registry;
wherein the physical printer is configured for identifying a geographic location of the physical printer as location information to the registry storing the location information associated with the physical printer in the registry;
wherein the coordinate-based location information is collected by the location information collection module from a location service selected from one or more of a GPS satellite system, a Wi-Fi location-based service, an IP address-based service, and a cellular tower-based location.

2. The physical printer of claim 1, wherein the coordinate-based location information is formatted as GPS coordinates.

3. The physical printer of claim 1, wherein the administration interface provides a unique identifier of the physical printer to identify the physical printer to the printer database server.

4. A system for processing imaged feedback information, the system comprising:
a mobile device located in proximity to a physical printer, the mobile device having a processor and memory, the processor configured to execute:
a location information collection module of the mobile device that collects coordinate-based location information; and an administrator interface connected to the location information collection module to:

present a user interface providing a first identifier of the physical printer for selection by a user of the mobile device in order for the user to select the physical printer;

obtain an indication uniquely identifying the physical printer through imaging the indicator using a camera of the mobile device, the indication uniquely identifying the physical printer representing feedback information made available by the physical printer at a physical location of the physical printer for confirming the mobile device being actually located at the physical printer associated with the first identifier; and submit to a printer resource database server the coordinate-based location information in combination with information pertaining to the indication uniquely identifying the physical printer for updating location information associated with the physical printer stored in a resource registry with the coordinate-based location information as a current location of the physical printer;

wherein the coordinate-based location information is obtained from a location service selected from one or more of a GPS satellite system, a Wi-Fi location-based service, an IP address-based service, and a cellular tower-based location.

5. The system of claim 4, wherein the coordinate-based location information is formatted as GPS coordinates.

6. The system of claim 4 wherein the indication is encoded in a bar code.

7. The system of claim 4 wherein the indication is information extracted from the indication.

8. The system of claim 4 wherein the information pertaining to the indication is a code or information extracted from the indication.

9. A system for processing imaged feedback information, the system comprising:

a printer resource database server the printer resource database server having a processor and memory, the processor configured to execute instructions stored in the memory to:

receive coordinate-based location information from the physical printer as obtained by a mobile device;

obtain from the physical printer information pertaining to an indication uniquely identifying the physical printer as obtained by the mobile device through imaging the indication using a camera of the mobile device, the indication representing feedback information made available to the mobile device by the physical printer at the physical location of the physical printer for confirming the mobile device being actually located at the physical printer; and submit the coordinate-based location information in combination with the information pertaining to the indication to a resource registry for updating location information associated with the physical printer stored in the resource registry with the coordinate-based location information as a current location of the physical printer;

wherein the coordinate-based location information is obtained from a location service selected from one or more of a GPS satellite system, a Wi-Fi location-based service, an IP address-based service, and a cellular tower-based location.

10. The system of claim 9, wherein the coordinate-based location information is formatted as GPS coordinates.

11. The system of claim 9 wherein the indication is encoded in a bar code.

12. The system of claim 9 wherein the information pertaining to the indication is a code or information extracted from the indication.

* * * * *